Patented Jan. 18, 1938

2,105,664

UNITED STATES PATENT OFFICE 2,105,664

CATALYTIC HYDROGENATION OF HYDROAROMATIC CARBOXYLIC ACIDS AND THEIR ESTERS

Wilbur A. Lazier, Marshallton, Del., assignor to E. I. du Pont de Nemours & Company, Wilmington, Del., a corporation of Delaware No Drawing. Application November 21, 1934, Serial No. 754,184. In Great Britain April 17, 1930

14 Claims. (Cl. 260—153)

This invention relates to catalytic processes for the production of cyclic alcohols, esters, and ethers. More particularly, it relates to processes for the catalytic reduction by means of elementary hydrogen of homocyclic hydroaromatic acids, their esters, and their anhydrides to the corresponding alcohols. Specifically, the invention relates to the hydrogenation of hexahydrophthalic acids and their derivatives, and to the use of certain catalysts particularly well suited to these reactions.

This application is a continuation in part of co-pending applications Serial Nos. 584,573 and 584,574, filed January 2, 1932; Serial No. 470,238, filed July 23, 1930; Serial No. 445,224, filed April 17, 1930; and Serial No. 690,568, filed September 22, 1933.

For many years the only known methods for the reduction of carboxylic acids, esters, and their anhydrides to the corresponding alcohols were by purely chemical means involving the consumption of expensive reducing agents. The most successful procedure was that outlined by Bouveault and Blanc (Chem. Zentr., 1904, II, 184; 1905, II, 1700). This process involves preparing an ester of the acid to be reduced and the use of metallic sodium and absolute alcohol as the reducing agent. Thus, it has been possible to prepare alcoholic derivatives of the simple aliphatic carboxylic acids. This method, however, is so costly as to render its use prohibitive for the manufacture of various alcoholic products which might otherwise be very useful in the arts.

By suitable modifications of processes fully described in the copending specifications to which reference has already been made, it has now become possible to realize on a commercial scale a technically and economically successful catalytic hydrogenation of homocyclic hydroaromatic acids, their esters, and their anhydrides, whereby alcohols are formed which correspond in the number of carbon atoms to the acids or acid derivatives subjected to the hydrogenation treatment. Other products such as the corresponding saturated hydrocarbons, ethers, and esters of the newly formed alcohols may also be prepared in this way by minor variations in the procedure, but the invention is primarily concerned with the production of alcohols which are the intermediate products between the esters and the corresponding hydrocarbons resulting from exhaustive hydrogenation.

In copending application Serial No. 584,573, filed January 2, 1932, there is contained a description of the successful hydrogenation of carboxylic ring compounds such as carboxylic acids of the homocyclic hydroaromatic series and their derivatives, and there is specifically described in Examples 1 and 3, the hydrogenation of ethyl hexahydro-ortho-toluate and hexahydrobenzoic acid, respectively. The hydrogenation processes therein described effect the hydrogenation of the ester and acid groups of the carboxylic compounds, thereby yielding alcohols. This type of hydrogenation is to be distinguished sharply from the process of hydrogenating the aromatic nucleus as practiced at a much earlier date, and which consisted in agitating an aromatic acid compound with a suspended nickel catalyst in the presence of gaseous hydrogen under a pressure slightly in excess of atmospheric pressure. In the processes of the prior art, the temperatures employed are usually 150°–200° C. and are never greater than 225° C., while the pressures customarily used are only slightly in excess of atmospheric pressure.

This invention has as an object the provision of processes for the conversion of hydroaromatic carboxylic acids, their esters, and their anhydrides to the corresponding alcohols and other products. A further object of the invention is the provision of processes for the preparation of the reduction products of hexahydrophthalates, benzoates, and toluates. A further object is the preparation of hexahydroaromatic alcohols including cyclohexyl alkanols and hexahydrophthalyl alcohols. A still further object is the preparation of hexahydrophthalide, hexahydrophthalyl ether, and methylcyclohexyl carbinol. Other objects will appear hereinafter.

These objects are accomplished by the following invention wherein homocyclic hydroaromatic carboxylic acids, their esters, or anhydrides are catalytically hydrogenated to homocyclic hydroaromatic alcohols at a pressure in excess of ten atmospheres and a temperature in excess of 200° C.

The processes of the invention are characterized by the use of an excess of hydrogen and temperatures and pressures much in excess of those ordinarily employed. In general, the invention is carried out by bringing the hydroaromatic carboxylic compound such as diethyl hexahydrophthalate and hydrogen into intimate contact with a suitable alcohol-forming catalyst at relatively high temperatures and pressures. It has been found, in accordance with the present invention, that organic carboxylic compounds in which the carboxylic group is attached directly to a saturated or partially saturated ring of carbon atoms, or is contained in a side chain attached to said ring, are amenable to catalytic hydrogenation to the corresponding hydroxyl derivatives. There are however several modifications of the general process. For example, a mixture of the compound to be hydrogenated, solid catalyst, and gaseous hydrogen may be brought together at high temperatures and pressures with suitable agitation in a closed autoclave capable of withstanding the necessary pressure. In this case the catalyst is preferably a composition containing copper either in the elementary form or combined with oxygen as a lower oxide. Other hydrogenating metal oxides may be employed in conjunction with copper, or suitable catalyst supports such as kieselguhr, silica gel, and activated carbon may be used. In another modification of the process, the hydroaromatic carboxylic compounds and hydrogen are passed under high pressures and elevated temperatures over mixed hydrogenation catalysts containing substantial quantities of difficultly reducible oxides of hydrogenating metals prepared in a suitable granular form and held in place in a pressure-resisting tube. Contrary to expectation, it has been found that under high hydrogen pressures hydroaromatic acids and their derivatives are much less susceptible to decomposition by heat than would be supposed from their behavior when heated in air. Under reducing conditions and in the presence of a suitable catalyst the decomposition, if such it may be termed, takes place in a controlled manner and with the absorption of hydrogen and the production of the corresponding alcohols.

The following examples are illustrative of some of the methods that may be employed in the practice of the invention:

Example 1

A hydrogenation catalyst was prepared as follows: 23 g. of cadmium nitrate, 24 g. of copper nitrate, and 245 g. of zinc nitrate was dissolved in 500 cc. of water and mixed at ordinary temperature with an equal volume of water containing 126 g. of ammonium bichromate and 75 cc. of 28 per cent ammonium hydroxide. After stirring, the mixture was exactly neutralized with additional ammonium hydroxide and allowed to settle. After several washes by decantation, the precipitate was filtered, dried, ignited at 400° C. and compressed into tablets or grains suitable for use in catalytic gas apparatus.

Twenty-five cc. of the mixed chromite catalyst prepared as described above was loaded into an alloy steel reaction vessel capable of being heated and withstanding high pressures. The tube was fitted with a preheater, a pump for injecting liquid at a constant rate, a T-connection for introducing hydrogen under pressure, a suitable condenser and trap for separating liquid products, and exit control valve.

The diethyl ester of hexahydrophthalic acid was pumped over the catalyst at the rate of 100 cc. per hour together with an amount of hydrogen equal to about twenty times that necessary for complete reduction of the ester. The temperature was maintained at 385° C. and the hydrogen pressure at 2900 pounds per square inch. The ester was converted to the vapor phase in a preheater before passing into the autoclave. After leaving the autoclave, the liquid products formed by hydrogenation were separated from the hydrogen gas stream by condensation. Four hundred grams of the crude product yielded upon fractional distillation: 136 grams of 2-methylcyclohexyl carbinol, 32 grams of hexahydrophthalyl ether, and 7 grams of hexahydrophthalyl alcohol.

Example 2

A copper chromite catalyst was prepared by igniting copper ammonium chromate and extracting it twice with dilute acetic acid. The resulting copper chromite powder was employed for hydrogenation without further treatment.

A high pressure autoclave equipped with an agitator was charged with 4000 grams of the ethyl ester of hexahydro-ortho-phthalic acid and 320 grams of the copper chromite hydrogenation catalyst prepared as described above. Compressed hydrogen was introduced until a pressure of 3000 pounds per square inch was attained. The contents of the autoclave were heated and agitated for 11 hours at a temperature of 255° C., the hydrogen pressure being maintained by introducing a fresh supply of gas as needed. Hydrogen was rapidly absorbed as evidenced by the steady drop in pressure.

A determination of the saponification number of the reaction products indicated a 79.5 per cent conversion of the diethyl hexahydro-ortho-phthalate. The reaction products were saponified with alcoholic potassium hydroxide and the neutral fraction was extracted with ether and distilled. The aqueous layer contained the potassium salt of o-hydroxymethylbenzoic acid and was acidified to regenerate hexahydrophthalid. The following compounds were obtained in the quantities given: 313 grams of hexahydrophthalyl alcohol (boiling point 130° C. at 2.5 mm.); 500 grams of hexahydrophthalyl ether (boiling point 32°–35° C. at 2.5 mm.); 300 grams of 2-methyl-cyclohexyl carbinol (boiling point 59°–63° C. at 2.5 mm.); 360 grams of hexahydrophthalide (boiling point 124°–126° C. at 10 mm.).

In carrying out the hydrogenation in a batch liquid phase process, as described above, in place of the diethylhexahydro-ortho-phthalate there may be used under the same conditions of temperature and pressure the anhydride of hexahydro-ortho-phthalic acid prepared by hydrogenating the salt of phthalic acid in the nucleus with a nickel catalyst, liberating the free acid, and heating to form the anhydride. Methyl and other alkyl hexahydrophthalic acids, esters, etc., may also be hydrogenated by this process.

Example 3

The hydrogenation of diethyl hexahydroterephthalate differs markedly from that of the ortho-ester in that practically no by-products such as the hexahydrophthalyl ether or methylhexahydrobenzyl alcohol are formed. This behavior suggests that ether formation by elimination of water from the glycol does not take place in the para-compound as readily as in the case of the ortho-substituted ester.

Terephthalic acid was esterified with ethyl alcohol to form the diethyl ester. This compound was hydrogenated in a stirring autoclave in the liquid phase with a reduced nickel-on-kieselguhr catalyst at a temperature of 200° C. and a hydrogen pressure of 2000 pounds. The yield of diethyl hexahydroterephthalate was almost quantitative. After removing the nickel catalyst the ester was subjected to carboxyl hydrogenation by the method indicated below.

A copper chromite catalyst was prepared as follows: One thousand five hundred grams of copper nitrate dissolved in 4 liters of water was mixed with a solution containing 1000 grams of ammonium chromate in an equal volume of water. Ammonium hydroxide was added to neutralize the acidity developed during precipitation of the copper ammonium chromate. The precipitate was washed by decantation, filtered, and dried, after which it was ignited at a temperature of 400° C. The resulting copper chromite powder was employed for hydrogenation without further treatment.

Two hundred and fifty grams of the hexahydroterephthalate was agitated with 20 g. of the copper chromite catalyst at a temperature of 255° C. and under a hydrogen pressure of 3000 pounds per square inch. The decrease in saponification value corresponded to a 90 per cent hydrogenation of the ester to alcohols. An alkali insoluble fraction was fractionally distilled giving a product, B. P. 132° C. at 2 mm., which analyzed correctly for hexahydroterephthalyl alcohol. Only two per cent by weight of an unidentified material that was volatile with steam was obtained, which had a distinct terpene odor, reminiscent of hexahydrophthalyl ether. The conversion to crude hexahydroterephthalyl alcohol was about 70 per cent and practically the entire product boiled constantly on redistillation. On the basis of the 90 per cent reduction in ester number, this corresponds to a 77.5 per cent yield on the raw material reacting.

*Example 4*

A zinc-oxide-copper-kieselguhr catalyst for use in the hydrogenation of esters is prepared in the following manner: To a solution containing zinc nitrate and copper nitrate in equimolar proportions there is added an excess of ammonium hydroxide. The precipitate formed at first redissolves in the excess of the reagent. Kieselguhr is then added to the solution to the extent of 100 g. per mol. of metallic salts present and the whole charge is heated to 80° C. At this temperature air is passed thru the suspension until the excess ammonia is discharged. The precipitate is washed, filtered, and dried and reduced at 250°–300° C. in a stream of diluted hydrogen for about 10 hours.

A high-pressure autoclave is charged with 400 g. of the ethyl ester of hexahydro-ortho-toluic acid and 40 g. of the zinc oxide-copper-kieselguhr catalyst prepared as described above. Compressed hydrogen is introduced until a pressure of about 250 atmospheres is reached. The contents of the autoclave are heated 6 hours with stirring at a temperature of 325° C., a high hydrogen pressure being maintained by introduction of a fresh supply of gas. Hydrogen is rapidly absorbed as evidenced by the steady fall in pressure. Reduction of the carbethoxy group proceeds smoothly with the formation of ethanol and 2-methylcyclohexyl carbinol. The yields are 50–70 per cent.

Similarly, ethyl hexahydrobenzoate may be reduced to cyclohexyl carbinol, and the hydrogenated naphthoates and hydrogenated anthroates to the corresponding alcohols.

*Example 5*

A copper chromite catalyst is prepared by igniting copper ammonium chromate and briquetting the residual chromite composition. A solution of 500 g. of hexahydrobenzoic acid dissolved in two liters of hot absolute alcohol is passed over this catalyst together with an amount of hydrogen equal to 20 times that necessary for complete reduction of the carboxylic acid. The temperature is maintained at 385° C. and the pressure on the reaction system is held between 2500 and 3000 lbs./sq. in. The rate of flow of the acid solution is 150 cc./hour. The conditions for the reaction are controlled and the product collected as described in Example 1.

The reaction products are characterized by a low acid and saponification number indicating substantial conversion of the free acid to alcohol. After evaporation of the ethanol, cyclohexyl carbinol is obtained as the major product of the reaction.

The process is generally applicable to homocyclic hydroaromatic carboxylic acids, their esters, and anhydrides, i. e., to the acyl radicals of these acids but the acids, etc., having no more than 2 carbocyclic rings form a preferred group.

*Example 6*

Two hundred grams of ethyl phenylacetate were converted into the corresponding ethyl cyclohexylacetate by hydrogenation in the presence of 20 g. of reduced nickel-on-kieselguhr at a temperature of 125° C. and a pressure of 2000 lbs. per sq. in. The ethyl ester of cyclohexylacetic acid was isolated in a pure condition by fractional distillation. It was then subjected to carboxylic reduction by hydrogenation at higher temperatures and pressures in the presence of a barium-copper-chromite catalyst. The compound catalyst for this purpose was prepared by dissolving 26 g. of barium nitrate and 218 g. of cupric nitrate in 800 cc. of warm water. A multiple chromate precipitate was formed by the addition with stirring of a solution prepared by dissolving 126 g. of ammonium bichromate in 600 cc. of water and adding 150 cc. of 28 per cent ammonium hydroxide. The precipitate was washed, filtered, dried, ignited at 400° C. and extracted once or twice with 10 per cent acetic acid, and again washed and dried. Two hundred grams of ethyl cyclohexylacetate were then hydrogenated in the presence of 20 g. of the Cu-Ba-Cr catalyst prepared as described above. The hydrogen pressure used was about 3000 lbs. per sq. in. and the temperature about 255° C. The crude product was filtered, and subjected to continuous extraction whereby a 43 per cent yield of cyclohexylethanol was obtained.

In a similar manner cyclohexylpropanol has been prepared, starting with ethyl cinnamate. In this case both the olefine bond and the aromatic nucleus are attacked by the hydrogenation with nickel catalyst to yield the corresponding ethyl cyclohexylpropionate. This compound was thereafter hydrogenated to gamma cyclohexylpropanol according to the methods of this invention as outlined in the latter part of the above example.

Although certain definite conditions of operation such as temperature, pressure and time of contact of the material treated with the catalyst have been indicated in the above examples, it will be apparent that these factors may be varied within wide limits within the scope of the present invention. The catalytic reduction of hydroaromatic acids, their esters, and their anhydrides to alcohols or glycols requires the use of temperatures and pressures appreciably higher than customarily employed for other hydrogenation reactions. The temperature may range from above 200° C. up to 500° C. The preferred temperature range is 240–400° C., depending somewhat on the catalyst composition selected and the method used for carrying out a given reaction. The success of the process also depends on the use of elevated pressures in excess of 10 atmospheres, while the preferred pressure is 50–400 atmospheres. The maximum pressure which can be used is limited only by the strength of the reaction apparatus.

Where a flow process is used, the ratio of hydrogen to the carboxylic acid or the acid derivatives may be varied over a wide range; but the use of a substantial molecular excess of hydrogen, e. g., a ratio of about 2 to 10 mols or more of hydrogen per mol. of the material undergoing treatment, is preferred.

The rate at which the material to be hydrogenated may be passed over the catalyst where a flow process is used, is a function of the molecular weight of the material and of the catalytic activity of the contact mass. Ordinarily the rate will vary from 2 to 8 liquid volumes per hour per unit volume of catalyst, but higher rates may be employed at the expense of slightly lower rates of conversion.

Whereas the critical factors and inventive steps in the hydrogenation of hydroaromatic carboxylic compounds to alcohols are the use of high temperatures and pressures, it necessarily follows that suitable catalysts may be selected from among a number of different hydrogenating metals and oxides. Mild hydrogenating catalysts such as metallic copper and zinc oxide which are well known to be suitable for the synthesis of methanol from carbon monoxide and hydrogen are in general also suitable catalysts for the production of hydroaromatic alcohols. On the other hand there are certain very energetic catalysts such as metallic nickel and iron which are known to catalyze the formation of hydrocarbons from oxides of carbon and hydrogen. These ferrous metal catalysts, when employed in the hydrogenation of hydroaromatic acids and their esters tend to carry the reaction too far with the formation of hydrocarbons. Therefore if the hydrogenation is to be operated for the production of alcohols to the substantial exclusion of hydrocarbons it is preferable to select as the catalyst a composition comprising a member of the group of non-ferrous hydrogenating metals such as copper, tin, silver, cadmium, zinc, lead, their oxides and chromites, and oxides and chromites of manganese, and magnesium. Especially good results are obtained with finely divided copper oxide, either wholly or partially reduced and preferably supported upon an inert surface-extending material such as kieselguhr, or promoted by such oxide promoters as manganese oxide, zinc oxide, magnesium oxide, or chromium oxide. The above mentioned mild-acting catalysts may be termed the alcohol-forming catalysts to distinguish them from the more energetic hydrocarbon-forming elements of the platinum and ferrous metal groups. Elementary nickel, cobalt, and iron when suitably supported on kieselguhr may be used to effect the reduction of carboxylic compounds with hydrogen, but in these cases the product contains besides alcoholic bodies a preponderance of hydrocarbons, and this disadvantage in most cases will prove so serious as to preclude the use of these catalysts unless the hydrocarbons themselves are the desired end products. Non-ferrous metal, non-platinum metal, hydrogenating catalysts are therefore preferred.

Catalysts suitable for use in the liquid phase batch method of hydrogenation are preferably prepared in a powder form. The preferred catalyst for this purpose is usually a copper chromite prepared by igniting a double copper ammonium chromate to its spontaneous decomposition temperature as described in U. S. Patent 1,746,783. Many modifications of this procedure have been practiced involving the use of acid extraction, hydrogen reduction, and the use of a supplementary support such as kieselguhr but these are modifications in degree only. The essential feature is the use of copper oxide intimately associated or combined with chromium sesquioxide and the chromite method of preparation is a convenient method for effecting the desired association. The method, however, is not limited to copper, but may be practiced in the preparation also of zinc chromite, silver chromite, manganese chromite, etc.

For use in the continuous flow method of hydrogenation certain metal oxides belonging to the class of difficultly reducible hydrogenating oxides may be conveniently employed on account of their rugged character and the ease with which they may be shaped into hard granules for loading into stationary apparatus. By the term "difficultly reducible" is meant that the oxides are not substantially reduced to metal by prolonged exposure in a state of purity to the action of hydrogen at atmospheric pressure and at a temperature of 400°–450° C. Such oxides suitable for use as catalysts in the hydrogenation of hydroaromatic carboxylic compounds are zinc oxide, manganese oxide, and magnesium oxide. These oxides may be employed either alone or in combination with each other or with other metals or oxides which have a promoting action. Preferably the difficultly reducible hydrogenating oxides also are prepared in the form of chromites as already indicated in the examples.

Hydroaromatic acids and their derivatives are particularly susceptible to conversion to hydrocarbons, and it has been found that this undesirable side reaction may be largely prevented by employing a mild inorganic base added to the hydrogenation catalyst. For example, products having much higher hydroxyl values are obtained if a little magnesia, zinc oxide, lime, or barium hydroxide is added to the catalyst or to the reaction system. Preferably the alkali earth buffer is incorporated into the catalyst at the time of its precipitation.

The processes of the present invention are applicable generally to a wide variety of organic acids and acid derivatives containing ring structures. In particular they are applicable to carboxylic compounds belonging to the class characterized by the term homocyclic hydroaromatic acids. Some important members of this group are hexahydrobenzoic acid, the various hexahydrohydroxybenzoic acids such as hexahydrosalicylic acid, 1-, 2-, and 3-methylhexahydrobenzoic acids, hexahydro-ortho-, iso-, and terephthalic acids, hydrogenated anisic, naphthoic, naphthalic, and diphenic acids. The invention is also applicable to the preparation of cyclohexylalkanols which are derived from cyclohexane-substituted acids such as hexahydrophenylacetic and hexahydrophenylpropionic acids.

The invention is applicable to the type of compounds represented by the structure:

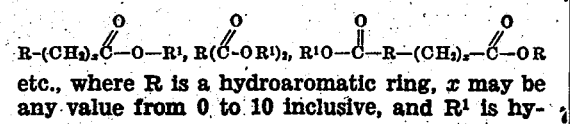

etc., where R is a hydroaromatic ring, $x$ may be any value from 0 to 10 inclusive, and $R^1$ is hydrogen, alkyl, or acyl. For hydroaromatic carboxylic compounds having the carboxyl attached directly to the ring, of course $x=0$. In the case of ethyl cyclohexylacetate and cyclohexylpropionate, $x=1$ and 2, respectively.

The carboxylic compounds may be employed in the form of the free acid, or as an ester or anhydride of the acid.

Many variations and modifications of the processes described may be employed to obtain the desired variations in the kind and quantity of hydrogenated products. In place of hexahydrophthalic acid or diethyl hexahydrophthalate or hexahydroterephthalate as above disclosed, other esters such as the butyl, cyclohexyl, propyl, amyl, and benzyl, and the glycerol and glycol esters may be employed. The methyl ester may be employed, but under some conditions it gives rise to undesirable by-products. Hexahydrophthalic anhydride may also be used. The corresponding derivatives of hexahydroisophthalic and hexahydroterephthalic acids may be used. The process is also applicable to the hydrogenation of substituted hexahydrophthalic, hexahydro-isophthalic and hexahydroterephthalic acids such as the methyl- and ethyl-hexahydrophthalic acids and their derivatives. The acid or acid derivative may be in the liquid or vapor state and may be hydrogenated in solution in a suitable inert solvent.

The above description and examples are intended to be illustrative only. Any modification of or variation therefrom which conforms to the spirit of the invention is intended to be included within the scope of the claims.

I claim:

1. The process for the production of homocyclic hydroaromatic alcohols which comprises catalytically hydrogenating the carbonyl group in the acyl radical of a compound selected from the class consisting of homocyclic hydroaromatic carboxylic acids and their esters, at a pressure of at least 10 atmospheres and at a temperature in excess of 200° C.

2. The process which comprises catalytically hydrogenating the acyl radical of a homocyclic hydroaromatic carboxylic acid to a homocyclic hydroaromatic alcohol at a pressure of at least 10 atmospheres and at a temperature in excess of 200° C.

3. The process which comprises catalytically hydrogenating the acyl radical of a homocyclic hydroaromatic carboxylic acid having not more than two carbocyclic rings to a homocyclic hydroaromatic alcohol at a pressure of at least 10 atmospheres and at a temperature in excess of 200° C.

4. The process which comprises catalytically hydrogenating a homocyclic hydroaromatic carboxylic acid to a homocyclic hydroaromatic alcohol at a pressure of at least 10 atmospheres and at a temperature in excess of 200° C.

5. The process which comprises catalytically hydrogenating a homocyclic hydroaromatic carboxylic acid having not more than two carbocyclic rings to a homocyclic hydroaromatic alcohol at a pressure of at least 10 atmospheres and at a temperature in excess of 200° C.

6. The process which comprises catalytically hydrogenating a homocyclic hydroaromatic carboxylic acid having not more than two carbocyclic rings to a homocyclic hydroaromatic alcohol at a pressure of at least 10 atmospheres and at a temperature of 300°–400° C.

7. The process which comprises catalytically hydrogenating a homocyclic hydroaromatic carboxylic acid having not more than two carbocyclic rings to a homocyclic hydroaromatic alcohol at a pressure of at least 10 atmospheres and at a temperature of 300°–400° C. in the presence of a hydrogenating metal oxide catalyst.

8. The process which comprises catalytically hydrogenating a homocyclic hydroaromatic carboxylic acid having not more than two carbocyclic rings to a homocyclic hydroaromatic alcohol at a pressure of at least 10 atmospheres and at a temperature of 300°–400° C. in the presence of a hydrogenating metal chromite catalyst.

9. The process of producing homocyclic hydroaromatic alcohols, which comprises catalytically hydrogenating the acyl radical of a hexahydrophthalic acid at a temperature in excess of 200° C. and a pressure in excess of 10 atmospheres.

10. The process of producing homocyclic hydroaromatic alcohols, which comprises catalytically hydrogenating a hexahydrophthalic acid at a temperature in excess of 200° C. and a pressure in excess of 10 atmospheres.

11. The process of claim 10 wherein a hydrogenating metal chromite catalyst is used.

12. The process of claim 10 wherein a hydrogenating metal chromite catalyst is used, the temperature is 240° C.–400° C., and the pressure is 50–400 atmospheres.

13. The process of producing homocyclic hydroaromatic alcohols, which comprises catalytically hydrogenating an ester of a hexahydrophthalic acid at a temperature in excess of 200° C. and a pressure in excess of 10 atmospheres.

14. The process of preparing homocyclic hydroaromatic alcohols, the step which comprises reacting ethyl hexahydro-o-phthalate with hydrogen at a temperature of approximately 385° C., and a pressure of approximately 200 atmospheres in the presence of a copper-cadmium chromite catalyst.

WILBUR A. LAZIER.